United States Patent [19]

Braasch

[11] Patent Number: 4,608,755
[45] Date of Patent: Sep. 2, 1986

[54] PORTABLE PIPE CUTTER

[76] Inventor: Morris C. Braasch, P.O. Box 1344, Julian, Calif. 92036

[21] Appl. No.: 670,566

[22] Filed: Nov. 13, 1984

[51] Int. Cl.[4] .............................................. B26D 3/16
[52] U.S. Cl. ............................................. 30/97; 82/4 C
[58] Field of Search ......................... 30/97, 96; 82/4 C

[56] References Cited

U.S. PATENT DOCUMENTS

| | | | |
|---|---|---|---|
| 1,493,452 | 5/1924 | Jardine | 30/97 |
| 3,431,649 | 3/1969 | Young | 30/97 |
| 3,732,618 | 5/1973 | Lorenz | 30/97 |
| 3,807,047 | 4/1974 | Sherer | 30/97 |
| 4,493,150 | 1/1985 | Garcia | 30/97 |

Primary Examiner—Jimmy C. Peters
Attorney, Agent, or Firm—Ralph S. Branscomb

[57] ABSTRACT

A portable pipe cutter is provided having a rotating annular cutter with radially advancing blades which are driven as they are rotating around a stationary helically threaded plate. Small keys attached to each of the blades each have a threaded face which engages the helically threaded advance plate so that as the cutter member rotates, the inwardly directed blades not only rotate around a pipe but also advance linearly as a function of angular distance traverse. The unit is characterized by being portable, and having the rotating cutter member separable into semi-annuli, as is the bearing ring in which the cutter member rotates, so that the entire structure can be used anywhere along a continuous pipe, without being inserted over the end.

9 Claims, 14 Drawing Figures

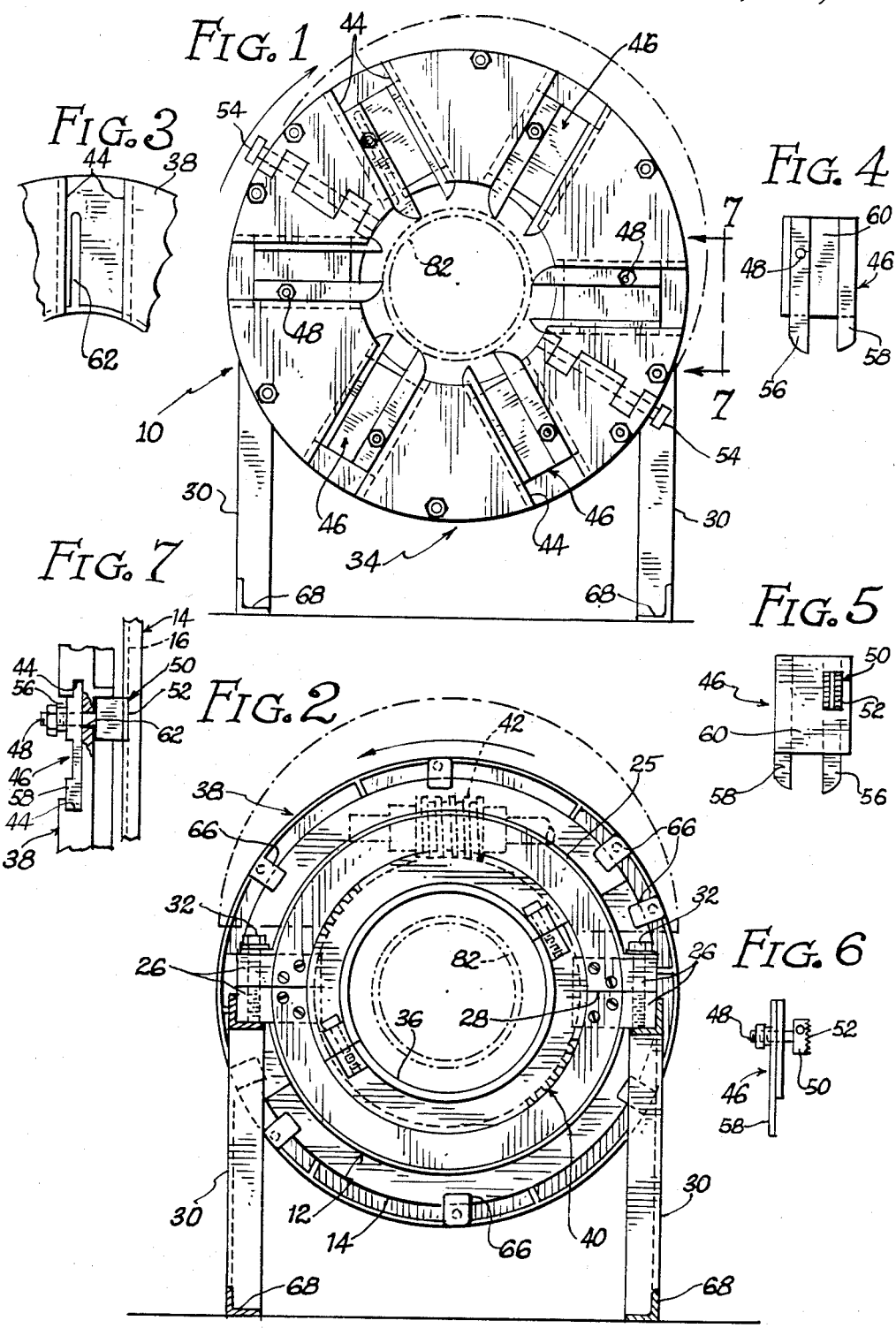

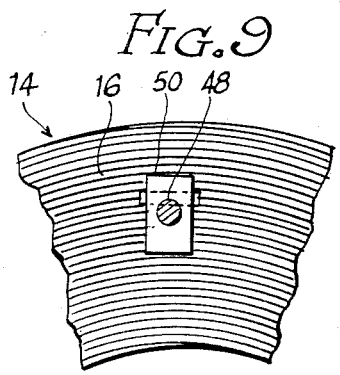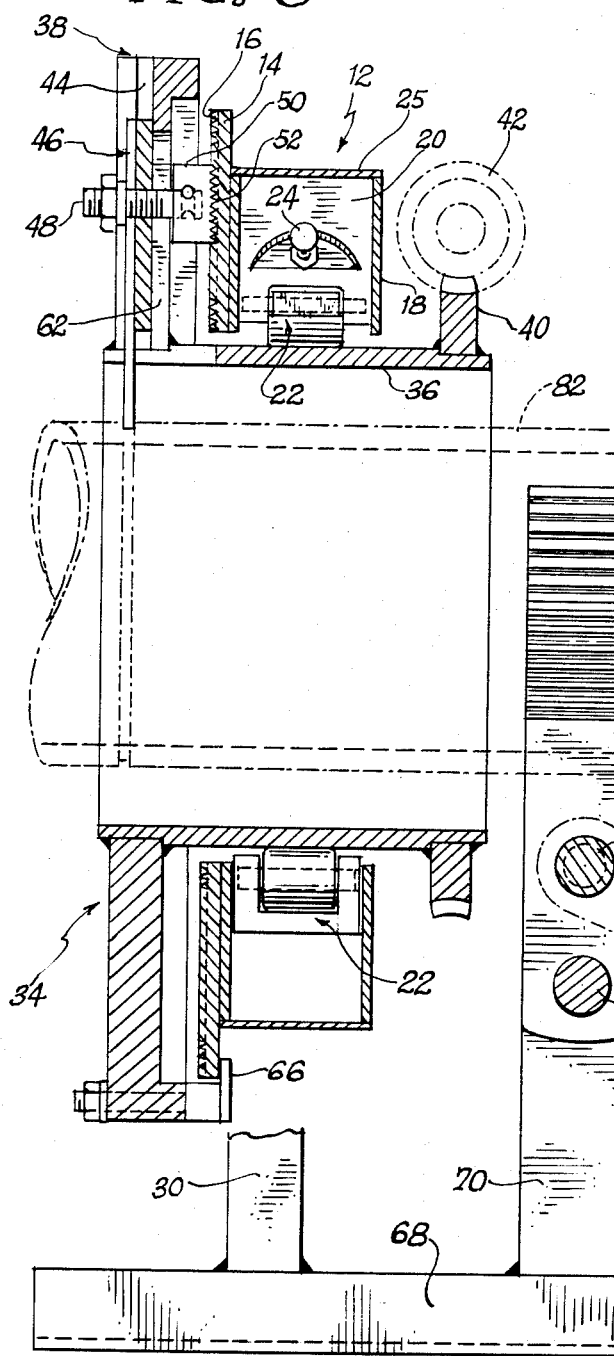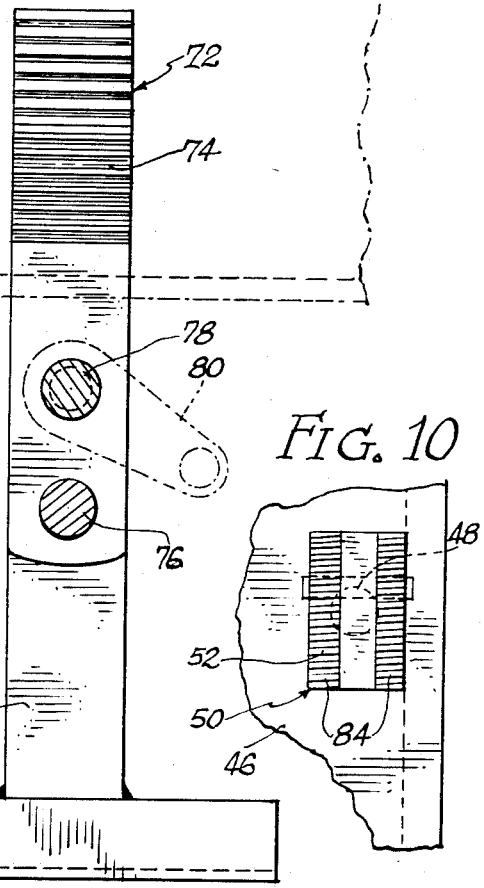

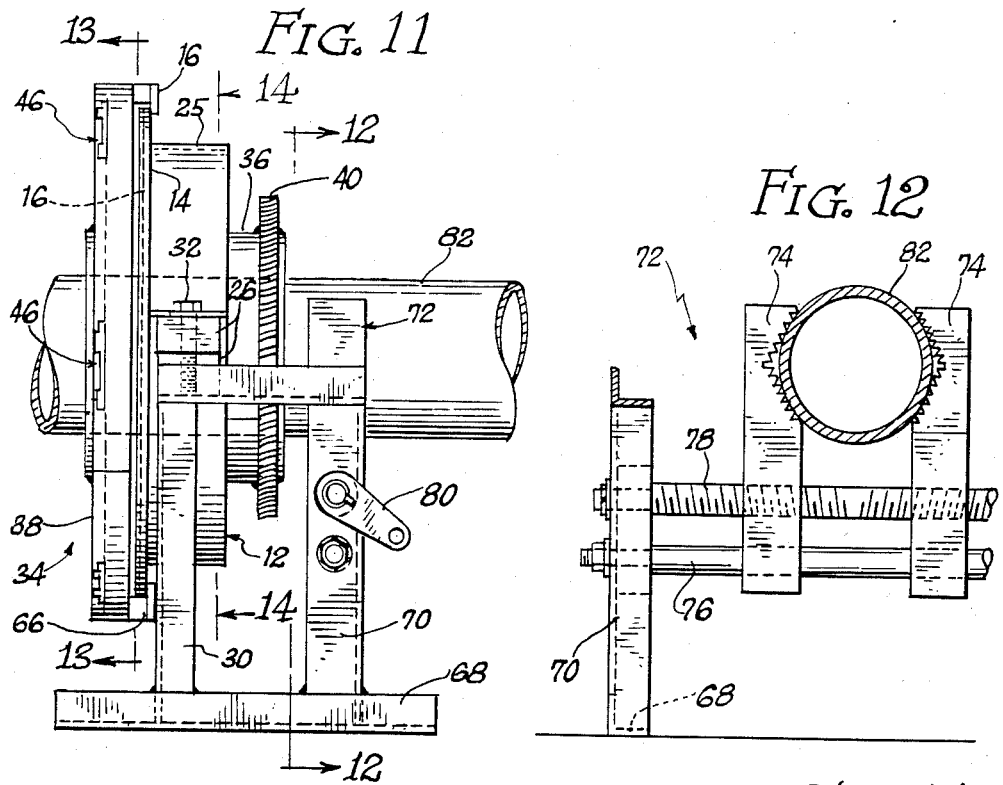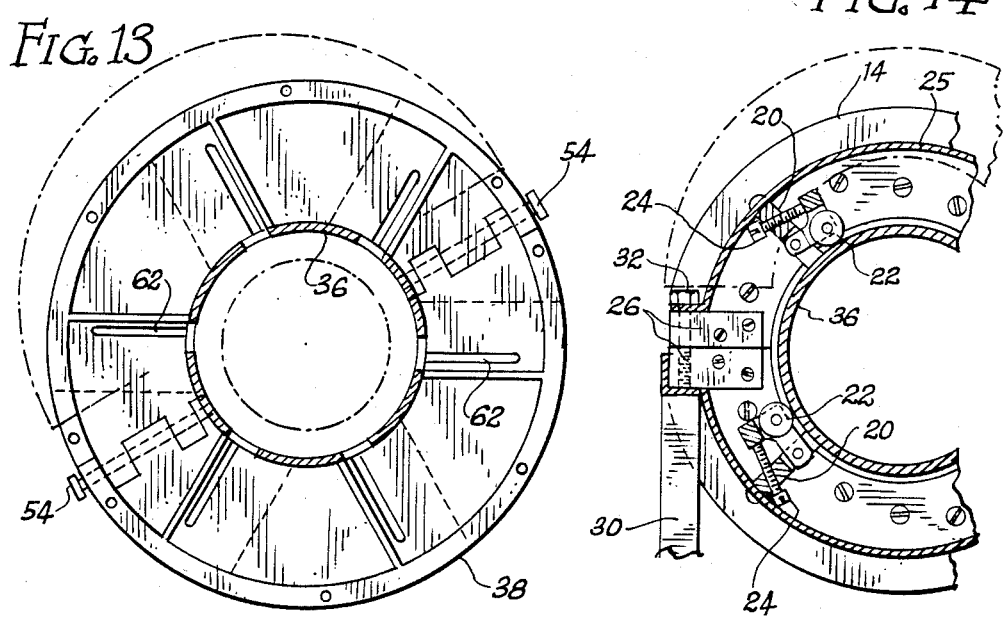

PORTABLE PIPE CUTTER

BACKGROUND OF THE INVENTION

Pipe cutters exist in all shapes and sizes. They range from the small, copper tubing cutters used by plumbers, to enormous cutters weighing several tons that are used in factories and steel production facilities.

However, cutters for pipes of a size range of up to six inches generally are of the multi-ton immobile type, requiring that the pipe be brought into the factory or to the site where the cutter is located.

Obviously, this is inappropriate for a field cutter, where a pipe may require cutting along a continuous length. It is impossible to bring the pipe into the factory. Thus, generally the pipe must be cut with some kind of saw, which may be awkward due to the confined spaces in which the pipe may be found. Sawing may also take a considerable length of time. Much of it may have to be done manually, requiring considerable physical effort.

Although there are some portable cutters that will cut pipes with such diameters, nonetheless they tend to be awkward in use and not really very portable at all. There is a need for a truly portable cutter, which can even be moved independently from its motor, and assembled piece by piece around a pipe, on location.

SUMMARY OF THE INVENTION

The instant invention fulfills the above stated need by providing a pipe cutter that utilizes a rotary, annular cutting member that can be split into two semi-annuli and engaged around the pipe on location. Around the cutter member, once it has been re-connected to define an annulus amoun$ the pipe, a second split annulus is installed which defines a bearing ring around the cutter member. A frame mounts a vice-like pipe holder, and a worm drive which engages a ring gear which is part of the cutter element. The worm drive can in turn be driven by a motor as simple as an electric drill.

Once in position, a power drill or other motor is operated to rotate the cutting element, on the face of which are evenly angularly spaced radially extended tracks, each of which slideably mounts a radially slideable blade. The blade mounts a key behind it which has a threaded face which engages the helically threaded face of an advance plate, which is stationary relative to the rotating cutter member with its slideable blades thereon. Thus, continuous rotation in the proper direction of the cutter element, together with its mounted blades, causes the keys to ride on the threaded face of the advance plate, moving the respective blades, closer and closer radially inwardly. Thus, once the blades move in far enough to contact the surface of a pipe engaged in the pipe holder, they will continue to rotate and continuously advance in a linear fashion until the pipe is completely cut. At this point, if possible the cutter can merely be slipped off the end of the cut pipe and removed, or if not, would require disassembly into the form in which it was initially engaged around the central section of the pipe.

BRIEF DESCRIPTION OF THE DRAWINGS

FIG. 1 is an elevation view of the front of the cutter in somewhat diagrammatic form;

FIG. 2 is an elevation view of the rear of the cutter, in somewhat diagrammatic form;

FIG. 3 is fragmentary detail illustrating a blade track and the slot for the follower key stem;

FIG. 4 is an elevational view of a typical blade;

FIG. 5 is an elevational view of the blade of FIG. 4 seen from the opposite side;

FIG. 6 is a side elevational view of the blade illustrating the stem and the key connected thereto;

FIG. 7 is a fragmentary elevational view taken along line 7—7 of FIG. 1;

FIG. 8 is a sectional view taken through the axis of the cutter and illustrating a pipe to be cut in phantom;

FIG. 9 is a fragmentary view of the helical threading of a segment of the advance plate with the follower key thereon;

FIG. 10 is a fragmentary view showing the face of a typical following key;

FIG. 11 is a side elevation view of the cutter;

FIG. 12 is a section taken along line 12—12 of FIG. 11;

FIG. 13 is a section taken along line 13—13 of FIG. 11; and,

FIG. 14 is a section taken along line 14—14 of FIG. 11.

DETAILED DESCRIPTION OF THE PREFERRED EMBODIMENT

The most basic part of the cutter is the frame 10, which for purposes of the claims will be considered to be all of the nonrotary structure of the cutter, including the bearing ring 12. The quickest understanding of the operation of the cutter will probably be achieved by discussing the bearing ring first, with reference to FIG. 8. The bearing ring is stationary, being part of the frame, and at its forward face defines an annular advance plate 14 which has annular threading as indicated at 16 and detailed in FIG. 9. A rear plate 18 is spaced from the front plate by periodic spacers 20 which also mount a screw-adjustable roller bearing structure 22. It should be clear how these rollers are adjusted radially inwardly or outwardly relative to the cutter by means of rotating the adjustment screw 24, from a glance at FIG. 14. Once the rollers have been tightened to adjust for wear and play, they are left alone and would not ordinarily form part of the invention or be particularly important on a day-to-day basis. Semi-cylindrical covers 25 enclose the bearing ring.

Again with reference to FIG. 14, the two plates 14 and 18 also sandwich a pair of blocks 26 at the left and right side. These blocks coincide with the split 28 between the substantially identical upper and lower halves of the bearing ring. The left and right lower blocks 26 are part of the lower half of the bearing ring and are permanently attached to the frame, in particular frame members 30 as seen in FIG. 14 and at 32. The upper ones of the block 26 on the other hand are bolted with bolts 32 to the lower blocks. Thus, by removing the bolts 32, the entire upper half of the bearing ring can be removed from the lower half. Again turning to FIG. 8, removal of the upper portion of the bearing ring would enable the entire cutter member 34 to be separated from the bearing ring and the other portions of the cutter frame.

With continuing reference to FIG. 8, the cutter element comprises a coaxial cylindrical collar 36 which is journalled in the bearing ring. At the front of the cutter member is an annular face plate 38, and at the rear there is a ring gear 40, such that as the worm drive 42 rotates the ring gear, the face plate is also rotated. The face plate has a plurality of angularly spaced radially extended blade tracks 44 in which ride blades 46. Bolts 48 pass through each blade, to define a stem which mounts the follower key 50 for each blade. Although this will be described in more detail hereinafter, it can be seen in FIG. 8 that the follower key of each blade has a threaded face 52 which engages the threaded face of the advance plate 14, such that, inasmuch as the threads on the advance plate are helical, rotation of the face plate would cause the blades to advance or retreat radially, depending on the direction of rotation of the cutter member relative to the stationary threaded advance plate.

It has been mentioned that the top half of the bearing ring can be removed to separate the cutter member from the rest of the structure, and additionally the cutter member itself can be separated into two havles by removing pins 54, best shown in FIGS. 1 and 13, which pass through radial bores in interlocking portions of the halves of the cutter member to retain same together. Should this pin and interleaved face plate interconnection be of inadequate strength, a second, similar retainer pin arrangement could be utilized at the rear end of the collar, to the right of the ring gear as shown in FIG. 11. Additionally, clearly pilot nibs and holes could be incorporated to insure the proper alignment of the two halves of the cutter member when brought together.

As discussed in the summary, because the cutter member can be separated in half, and the bearing ring can be split and removed, the entire structure can be put around a continuous length of the pipe. It need not have a pipe end to slip over.

The cutter arrangement is shown in more detail in FIG. 7, which is an elevational view taken along line 7—7 of FIG. 1. The blade element 46 is actually comprised of a cutter 56 and a guide 58, both of which are integral with a connecting plate 60. The edges of the plate slide in tracks 44 defined radially in the face plate 38. Along each of the tracks is a slot 62 that is cut completely through the face plate, along the portion of the track's length as shown in FIG. 3. This slot accommodates the shank or stem of the bolts 48, as shown in FIG. 7, as they pass through the plate to engage the follower key 50.

In order to keep the follower keys in reasonably tight compression against the advance plate so that the threads will not skip, the perimeter of the face plate utilizes a plurality of spaced flanges 66, which as shown in FIG. 11 engage around behind the perimeter of the advance plate to maintain good interengagement between the keys and the advance plate.

The frame 10 includes a pair of base bars 68 which mount the uprights 30, and rearwardly of the uprights 30 there is a second pair of uprights 70 which mount a pipe clamp 72. The pipe clamp has a pair of jaw members 74 slidable added on a guide rod 76, and a threaded rod 78 which is counterthreaded on opposite sides of its centerline so that rotation of the bar in any direction will either separate or converge the two jaw elements. A crank 80 operates the threaded screw 78, and a pipe 82 is best shown in FIG. 12 as being gripped by the pipe clamp.

Inasmuch as the center of the pipe clamp is relatively fixed, any error of coaxiality between the pipe clamp and the cutter itself would have to be accomodated by adjustment of the roller bearings 22. Once adjusted, except for wear and accumulated play over a period of time, the bearings should require no further tinkering.

Because, as one moves radially on the face of the advance plate 14, the radius of curvature changes, the range of diameters of such a cutter as disclosed herein is of necessity limited. To reduce this limitation somewhat, the threaded faces of the keys 52 are provided as a pair of spaced subfaces 84. The narrower the width of these subfaces, the greater the range of radial travel available. If these rows merely consisted of points rather than elongated threads, theoretically the possible radial travel would be infinite.

The worm gear indicated at 42 could be mounted to the upper part of the bearing ring, or to the frame members of the frame 10. As can be seen in FIG. 8, either way the top of the bearing ring could be removed and the cutter member extricated. The motive force which drives the worm gear could be a separate motor which is removeably attached to the frame, or a portable electric drill, having a chuck which could be engaged on the worm gear shaft.

Thus, the instant pipe cutter is not only portable, but comes in several pieces which reduce weight and enable it to be fitted into relatively small areas in the field, and once in place, enable the pipe to be cut in an efficient and automatic fashion rather than requiring the chewing away with saws for what could possibly be hours of time. There is also very simple construction, this absence of complex mechanisms making it more rugged and durable in the field and also making simpler and more economical of manufacture.

I claim:

1. A portable pipe frame cutter comprising:
   (a) a stationary frame;
   (b) a rotable annular cutter member journalled in said frame;
   (c) said cutter member mounting a plurality of cutting blade elements radially slideable relative to said cutter member;
   (d) an annular threaded advance plate having a helical threaded face defined by said frame;
   (e) for each of said blade elements, a key having a threaded face engaged with the threaded face of said advance plate;
   (f) means rotably driving said cutter member in said stationary frame such that as the keys of the blade elements follow the threads of the threaded face of the advance plate, said blades selectively radially advance or retreat, depending on the direction of rotation of said cutter member, so that said blades can be simultaneously rotated around and advanced into a pipe extending through said annular cutter member, to progressively cut deeper into said pipe until it is completely cut through;
   (g) said rotating annular cutter member including a coaxial cylindrical collar; (h) said frame including a bearing ring surrounding said collar and journalling same from the outer surface; and,
   (i) said bearing ring being separable into segments to permit the removal of said cutter member therefrom.

2. Structure according to claim 1 wherein said frame mounts said advance plate, said collar mounts a ring gear on the rear end thereof spaced from said advance plate, said bearing ring journals said collar between said advance plate and said ring gear, and including a worm gear journalled in said frame and engaging said ring gear.

3. Structure according to claim 1 wherein said cutter member defines:

(a) an annular faced plate adjacent the threaded side of said advance plate;
(b) a plurality of evenly circumferentially spaced radial tracks on the side thereof remote from said advance plate slideably mounting said blade elements;
(c) a radial slot passing through said face plate along each track; and, each of said keys resides between said face plate and said advance plate, and is connected to its respective blade by a stem passing through said slot.

4. Structure according to claim 3 wherein each of said blade elements comprises a cutting tool and a guide, said guide riding in a circumferential groove which is being progressively cut into a pipe as the cutter operates to steady the cutter in said groove.

5. Structure according to claim 1 wherein said cutter member splits into at least two segments to permit the installing and removal of same to make continuous pipe section.

6. Structure according to claim 5 wherein said cutter member is split into two semi-annular halves which are joined together by radially extended link pins.

7. Structure according to claim 1 wherein said bearing ring comprises said annular advance plate at the front, an annular rear plate, and a series of circumferential spaced spacers separating said advance plate and rear plate and mounting roller bearings to journal the collar of said cutter member.

8. Structure according to claim 7 wherein said roller bearings are pivotally attached to said spacers and radially adjustable relative to said bearing ring.

9. A portable pipe frame cutter comprising:
(a) a stationary frame;
(b) a rotable annular cutter member journalled in said frame; (c) said cutter member mounting a plurality of cutting blade elements radially slideable relative to said cutter member;
(d) an annular threaded advance plate having a helical threaded face defined by said frame;
(e) for each of said blade elements, a key having a threaded face engaged with the threaded face of said advance plate;
(f) means rotably driving said cutter member in said stationary frame such that as the keys of the blade elements follow the threads of the threaded face of the advance plate, said blades selectively radially advance or retreat, depending on the direction of rotation of said cutter member, so that said blades can be simultaneously rotated around and advanced into a pipe extending through said annular cutter member, to progressively cut deeper into said pipe until it is completely cut through; and,
(g) the threaded face of each of said keys being split into two spaced sub-faces extending crosswise against the threads of said advance plate to permit greater radial travel of said keys on said face without binding.

* * * * *